No. 750,083. PATENTED JAN. 19, 1904.
J. H. BRADY.
TRANSPOSING KEYBOARD.
APPLICATION FILED JAN. 22, 1903.
NO MODEL. 2 SHEETS—SHEET 1.
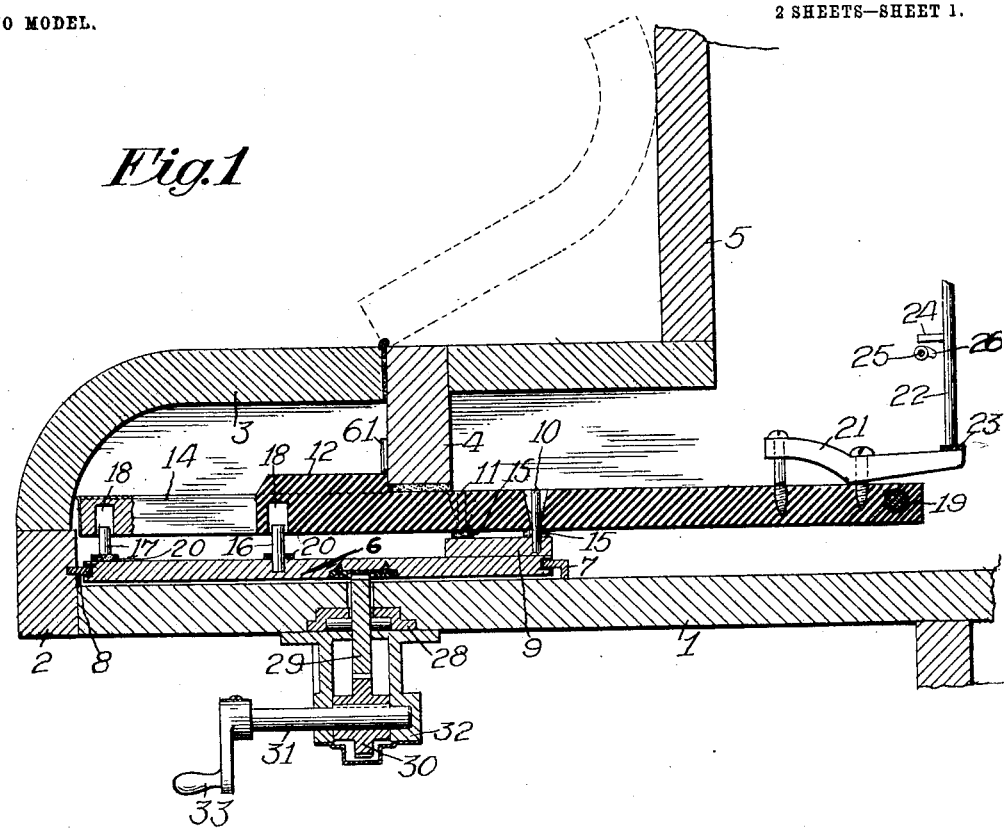
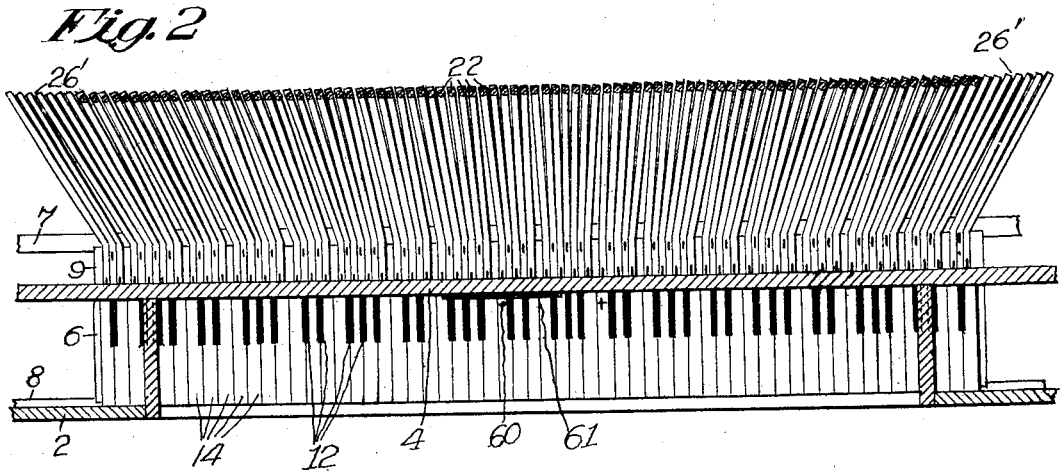
Witnesses:
Geo B Rowley
E. E. Potter
Inventor;
JOHN H. BRADY.
By H. Everth
Attorneys.

No. 750,083. PATENTED JAN. 19, 1904.
J. H. BRADY.
TRANSPOSING KEYBOARD.
APPLICATION FILED JAN. 22, 1903.
NO MODEL. 2 SHEETS—SHEET 2.
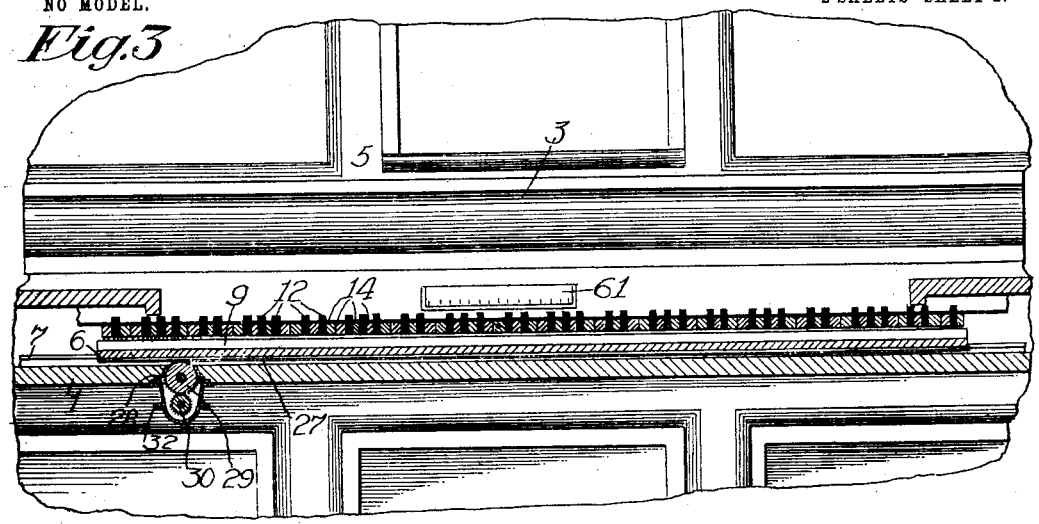
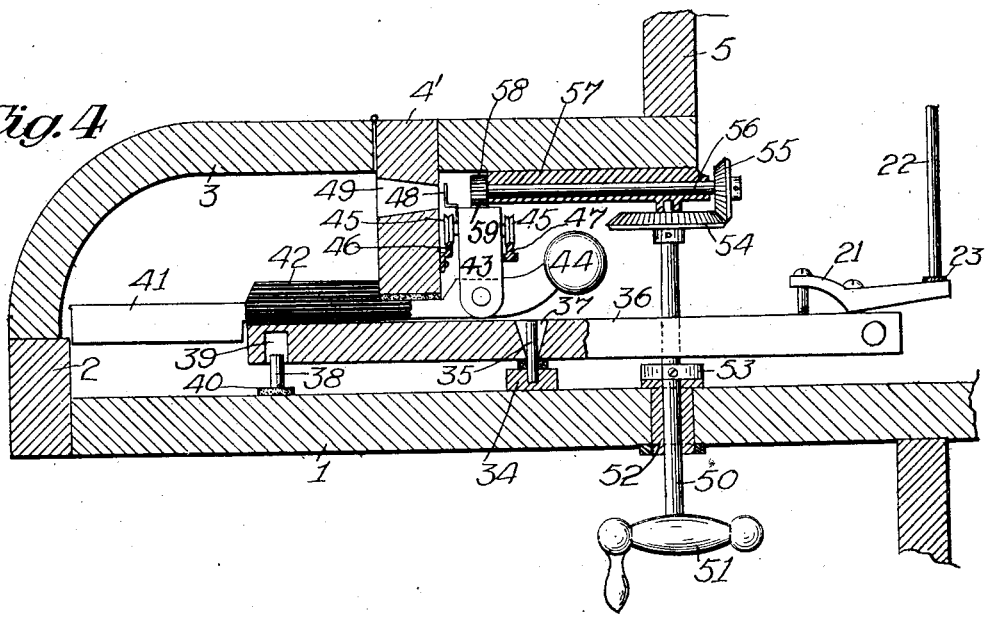
Witnesses:
Geo. B. Rowley
E. E. Potter
Inventor:
John H. Brady
By H. Forsyth
Attorney.

No. 750,083.                                                          Patented January 19, 1904.

UNITED STATES PATENT OFFICE.

JOHN H. BRADY, OF BALTIMORE, MARYLAND.

TRANSPOSING-KEYBOARD.

SPECIFICATION forming part of Letters Patent No. 750,083, dated January 19, 1904.

Application filed January 22, 1903. Serial No. 140,151. (No model.)

*To all whom it may concern:*

Be it known that I, JOHN H. BRADY, a citizen of the United States of America, residing at Baltimore, in the State of Maryland, have invented certain new and useful Improvements in Transposing-Keyboards, of which the following is a specification, reference being had therein to the accompanying drawings.

This invention relates to certain new and useful improvements in transposing-keyboards, and has for its main object to provide novel means whereby any piece of music may be easily transposed and played in any other key.

The invention has for its further object to materially simplify the reading of music for the piano, organ, or like instrument and enable those unable to play pieces written in a difficult key to readily transpose the same to another key, still, however, maintaining the musical result of the original key.

My invention consists in the novel construction, combination, and arrangement of parts hereinafter described and claimed.

I have illustrated my invention in the accompanying drawings, forming a part of this application, and wherein like numerals of reference will be employed for designating like parts throughout the different views of the drawings, in which—

Figure 1 is a transverse sectional view through the front of a piano, showing the same constructed in accordance with my invention, and means for shifting the keyboard proper. Fig. 2 is a horizontal sectional view of the same, showing the keyboard in top plan view. Fig. 3 is a longitudinal sectional view through the keyboard of the piano, showing a part of the piano in front elevation. Fig. 4 is a transverse sectional view through the front of a piano constructed with a keyboard to be shifted and showing means for shifting the same. Fig. 5 is a fragmentary front elevation showing the key-indicator.

As heretofore stated, I aim to accomplish the same result with my invention whether I shift the keyboard or whether I provide a keyboard to be shifted along to different positions over the keyboard. In my showing of both constructions I have illustrated only so much of the piano or other instrument as is necessary for the proper showing of the invention. With reference to the showing made in Figs. 1, 2, and 3 of the drawings I have illustrated a practical embodiment of my invention wherein the keyboard proper is shifted, and will now describe this construction. 1 indicates the supporting bed or plate for the keyboard of the instrument; 2, the front rail of the case; 3, the hinged keyboard-cover; 4, the rail to which the cover 3 is hinged, and 5 the upper front of the instrument-case, as in the ordinary instrument, these parts being illustrated in order to show my device in position. In accordance with this form of my invention I mount on the bed or table 1 a slide-plate 6, which operates between guide-rails 7 and 8, secured, respectively, to the table or bed 1 and to the rail 2, as shown. As this plate 6 is preferably made of wood or other light material, whereby to reduce the weight of the same, and the rails 7 8 in all probability of metal, I preferably insert a metallic runway in the edges of the plate 6 to receive said rails, whereby to make the operation of the plate more easy. The keys, both white and black, are supported from this plate 6, and in order to obtain the proper depression of the forward ends of the keys, whereby to elevate the rear ends thereof and cause the actions to actuate the hammers, I preferably mount on the plate 6, along the rear edge thereof, a strip 9. This strip 9 carries pivot-pins 10 and 11, the former for the black keys 12 and the pins 11 for the white keys 14. The apertures in the keys to receive these pins are made conical, whereby to permit the inclining of the keys, and between the keys and the strip 9 I preferably place a cushioning material 15, composed of felt or other like material. The board 6 carries guide-pins 16 17 for the black and white keys, respectively, these pins engaging in recesses 18, provided therefor in the underneath face of the keys. A cushioning material 20, such as felt or the like, is provided around the pins 16 17, whereby to prevent the striking of the keys against the board or plate 6. In order to insure the quick return of the keys after being struck, it is customary to weight the rear ends of the same, and this principle I also employ, the keys being weighted in any suitable manner, as shown at 19. The lifting lever or dog 21, which is attached to the keys adjacent the rear ends thereof for engaging the actions to actuate the hammers, is of the usual form of construction, and I may also employ the usual form of action 22. In practice these actions are preferably provided on their lower ends with felt or other like washers 23, and where I find that it is desirable or necessary to overcome any friction between the actions and the levers or dogs 21 while shifting the keyboard I provide means for elevating the actions until the keyboard is shifted. A convenient means for doing this is the provision of lugs or pins 24 on each action and the extension of a rod 25 through the case of the instrument and providing this rod with cams 26, directly beneath the pins 24, whereby when the rod is turned, so as to engage the cams with the pins, the actions will be elevated out of engagement with the levers or dogs 21, and after the keyboard has been shifted the rod is again turned, so as to disengage the cams from the pins and permit the actions to descend into proper position. As stated, where I shift the keyboard proper I construct the same with seven extra keys at each end, as shown at 26' in Fig. 2, whereby the shifting of the keyboard seven keys in either direction will give a full-octave range.

Means is provided for the easy manipulation of the keyboard in order to shift the same to obtain the desired result. Where the keyboard proper is shifted, a practical form of shifting means is that herein shown. This embodies a rack 27, which is preferably countersunk in the underneath face of the plate 6. In the underneath face of the bed or table 1 is placed a small bearing-box 28, in which is journaled a gear 29 to engage with the rack 27. This gear 29 is engaged and operated by a smaller gear 30, carried on a shaft 31, which is journaled in a suitable casing or boxing 32, secured to the underneath face of the table or bed 1. The shaft 31 is provided on its outer end with a suitable operating crank or handle 33, which is in a convenient position to be engaged by the operator when desired. In practice the gears 29 30 are so proportioned as to preferably give a large turn to the crank or handle 33 in order to obtain a small or slight movement of the keyboard, whereby to make the shifting easier of accomplishment and the adjustment more exact.

In Figs. 4 and 5 I have shown a modified form of construction whereby to obtain the same results as with the construction shown in Figs. 1 to 3, inclusive. In this modified form of construction I employ a keyboard and shift this along over the key-levers. In this showing of the modified form of construction the same reference-numerals are applied to those parts of the piano case or frame which are identical with those shown in Figs. 1 to 3, inclusive. In this construction I employ a key-lever, while in the other construction this lever and the key are integral. With the keyboard I mount a strip 34 on the table or bed 1, in which strip the pivot-pins 35 for the key-levers 36 are mounted. These pins project into the conical holes 37 in the key-levers, the latter being weighted or leaded at their rear ends and carrying the dogs or levers 21 to engage the actions 22. Cushioning material 23, such as felt or the like, will be provided between the actions 22 with this form of the device and the dogs or levers 21, as aforedescribed, for the shifting keyboard proper. Guide-pins 38 are carried by the table or bed to engage in recesses 39, provided therefor in the key-levers 36, and cushioning material 40 is provided around these pins to prevent knock of the key-levers on the plate or table 1. In this construction the white keys 41 and the black keys 42 lie over the forward portions of the key-levers 36, and these keys are pivoted in a common carrier 43. The rear ends of the keys are provided with weights or leads 44, whereby to normally return the keys rapidly, independently of their being returned by the key-levers, the weights or leads on the rear ends of the white keys being somewhat greater than those of the black keys, owing to the greater overhanging weight of the white keys to be provided for. The carrier 43 is mounted on wheels or trucks 45, which travel upon rails 46 47, provided therefor. A convenient form of construction is to attach the rail 46 direct to the inner face of the cover hinge-rail 4', while the rail 47 may be extended through and supported from the ends of the case. The carrier 43 carries a key-indicator 48, while the cover hinge-rail 4' is provided with a sight-opening 49, the indicator having the "key-marks" thereon, so that when the properly-indicated key-mark appears in front of the sight-opening 49 it indicates that the board has been properly shifted. Means must be provided, of course, in this form of construction for shifting the keyboard. A practical form of construction for this I have herein shown and will now describe. This embodies a vertical shaft 50, journaled in the bed or table 1 and provided at its lower end with a suitable crank or handle 51. A journal-box 52 is preferably provided for this shaft in order to give easy movement thereto, the shaft being supported by a collar 53, rigidly secured to the shaft and resting upon the upper end of the journal-box. The shaft 50 at its upper end carries a bevel-gear 54, which meshes with a smaller gear 55, carried on the rear end of a shaft 56. This shaft 56 is mounted in a suitable bearing 57, which may, as shown, be constructed so as to also form a bearing for the upper end of the shaft 50. At its forward end the shaft 56 carries a pinion or gear 58 to mesh with a rack 59 on the upper face of the carrier 43. As stated, in this form of construction the operator determines when he has properly shifted the supplemental or auxiliary keyboard by observing the key on the indicator 48, while in the form of construction shown in Figs. 1, 2, and 3—that is, in the construction wherein the keyboard proper is shifted—this is preferably determined by simply marking middle C with an indicating-mark, as at 60, and providing the front rail 4 with an indicating key-scale 61. With this construction as the mark 60 on key middle C comes opposite to the key marked on the indicating-scale 61 the proper shifting of the board has been obtained.

While I have herein shown and described the invention in detail, illustrating how the same results may be obtained either by shifting the keyboard proper or by the employment of a supplemental or auxiliary keyboard to be shifted and have shown a preferred form of actuating the keyboard and the supplemental or auxiliary keyboard, yet I do not wish to be understood as confining myself to the manner shown and described for operating the board, as this shifting means may be altered in many details without departing from the spirit of the invention or the scope of the appended claims.

Having fully described my invention, what I claim as new, and desire to secure by Letters Patent, is—

1. A device of the character described comprising a supporting-bed, a shifting keyboard, means for raising the actions above said board upon movement of the same, means for indicating the position of the board, a slidable plate having guide-receiving grooves formed therein, guides engaging in said grooves to support the plate above the supporting-bed, a rack member carried by said plate, a pinion engaging the rack and means carried below the bed of the piano for actuating said pinion to move the plate, substantially as described.

2. In combination with the bed of a piano a transposing-keyboard, a supporting-bed, a slidable plate having guide-receiving recesses formed in the ends thereof, keys pivotally secured to said plate, guides mounted in the frame of the piano engaging in the recesses of the plate to slidably support the same above the supporting-bed of the piano, a rack mounted on the plate, rotatable means engaging said rack adapted to give the same a longitudinal movement, indicating means for said plate, and means adapted to engage the actions to elevate the same above the plate on movement thereof, substantially as described.

3. In combination with the bed of a piano a transposing-keyboard, a supporting-bed, a slidable plate having keys thereon and provided with guide-receiving recesses, guides for said plate, said guides being extended above the supporting-bed of the piano-frame, a rack member carried by the plate, means for longitudinally moving said rack member, means mounted below the supporting-bed in engagement with said last-named means whereby the plate may be shifted, and means engaging the actions to elevate the same upon movement of the plate, substantially as described.

In testimony whereof I affix my signature in the presence of two witnesses.

JOHN H. BRADY.

Witnesses:
  W. B. SEWELL,
  C. C. KETCHAM.